United States Patent
Kassner

(10) Patent No.: US 7,254,476 B2
(45) Date of Patent: Aug. 7, 2007

(54) METHOD AND DEVICE FOR ASCERTAINING VALVE TIMING FOR GAS-EXCHANGE VALVES OF AN INTERNAL COMBUSTION ENGINE

(75) Inventor: Uwe Kassner, Moeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/245,226

(22) Filed: Oct. 5, 2005

(65) Prior Publication Data

US 2007/0151545 A1    Jul. 5, 2007

(30) Foreign Application Priority Data

Oct. 5, 2004 (DE) .................. 10 2004 048 319

(51) Int. Cl.
F02D 13/02 (2006.01)
G01M 19/00 (2006.01)

(52) U.S. Cl. ...................... 701/114; 73/115

(58) Field of Classification Search ............ 701/114; 73/115, 118.1

See application file for complete search history.

(56) References Cited

U.S. PATENT DOCUMENTS 4,633,707 A * 1/1987 Haddox ................... 73/115
6,240,359 B1 * 5/2001 Fujiwara et al. ............ 701/114

FOREIGN PATENT DOCUMENTS

DE    197 41 820    3/1999
DE    103 06 903    8/2004

* cited by examiner

Primary Examiner—Stephen K. Cronin
Assistant Examiner—Arnold Castro
(74) Attorney, Agent, or Firm—Kenyon & Kenyon LLP

(57) ABSTRACT

A method for ascertaining valve timing for gas exchange valves of an internal combustion engine in which a combustion chamber pressure characteristic is determined, a state function being calculated from the combustion chamber pressure characteristic and a combustion chamber volume characteristic, and the timing of the gas exchange valves is determined by analyzing the state function.

6 Claims, 2 Drawing Sheets

METHOD AND DEVICE FOR ASCERTAINING VALVE TIMING FOR GAS-EXCHANGE VALVES OF AN INTERNAL COMBUSTION ENGINE

BACKGROUND INFORMATION

Precise monitoring and control of the valves is necessary to allow an optimal engine operation. Specifically, this requires precise knowledge of the timing of the gas-exchange valves, i.e., the opening and closing instants of the intake or exhaust valves, with respect to the crankshaft position. There is increasing use of systems that allow a variation of the opening times with respect to the crank angle or, additionally, a variation of the opening cross section with respect to the crank angle. In the process, the direct mechanical coupling from cam to valves is lost, and different types of actuators decouple the camshaft from the valve motion in order to achieve the mentioned variation. Typical examples in this context are the variable camshaft adjustment or the fully variable valve adjustment.

Because the movement of the gas exchange valves is decoupled from the crankshaft angle, methods are required that allow monitoring of the valve timing as a minimum. Methods are known from the related art which determine the path or angle of the gas-exchange valves via direct transducers. Other methods are based on determining the valve opening by analyzing air quantity and rotational speed or the pressure in the combustion chamber.

The direct transducers are expensive and prone to malfunction due to their thermal and mechanical loading. Methods that require additional variables must be carefully adapted to each operating point of the internal combustion engine so as to avoid faulty diagnoses. In particular the indirect character of the method requires careful interpretation of the measured values.

German Patent Application No. DE 197 41 820 describes a method in which a pressure characteristic in the combustion chamber is analyzed. Using a gradient method, characteristic curve points that point to specific valve positions are determined. An opening or closing of a gas exchange valve manifests itself in a rapid change of the pressure gradient and is detected by a change in the operational sign of the second derivative of the pressure according to the volume.

German Patent Application No. DE 103 06 903 describes a method in which a theoretically calculated pressure characteristic in the combustion chamber is compared to an actually measured pressure characteristic. The opening time of the exhaust valve is inferred from the deviations of the two pressure characteristics. The theoretical curve is calculated assuming a polytropic expansion, by determining the polytropic exponent on the basis of two support points of the real measuring curve and the known combustion chamber geometry.

The methods that use the cylinder pressure are characterized by their direct evaluation of the combustion in the cylinder. However, the unavoidable signal noise is increased by the formation of the gradient and the higher derivative and thereby makes it more difficult to determine threshold values. On the whole, these are only small changes in the signal pattern, entailing all the problems of the numerical analysis. Furthermore, it is disadvantageous that once again a careful adaptation to all operating points of the engine is required.

SUMMARY OF THE INVENTION

The method according to the present invention has the advantage that a state function (K(i)) is calculated from the profile of the combustion chamber pressure and a profile of the combustion chamber volume, and valve timing is determined by analyzing the state function. Compared to a direct analysis of the combustion chamber pressure, this offers the advantage that in the state function an opening and closing of the gas exchange valves causes a significant change in the state function, so that this valve timing is able to be determined with high reliability.

According to the present invention, a polytropic exponent is to be selected as a function of the given operating mode. Since the polytropic exponents essentially do not change for a given operating mode, it advantageously suffices to store an individual polytropic exponent for specific operating modes, which will then be selected when calculating the state function.

A further modification provides to determine the polytropic exponent from at least two support points of the detected combustion-chamber pressure and the corresponding combustion chamber volume in a polytropic region. This has the advantage of allowing the polytropic exponent to be individually adapted to the actual situation of the internal combustion engine.

According to the present invention a time characteristic of the combustion chamber pressure for a relevant crankshaft angular range is detected in a first step; the state function is determined in a second step; significant points which represent the opening or closing instants of the gas exchange valves are determined in a third step; and in a fourth step it is finally ascertained whether the significant points lie within a tolerated interval. This provides an advantageous possibility for checking the performance reliability of the gas exchange valves. In particular when a closing or opening instant of the individual gas exchange valve cannot be determined or if it lies outside the tolerated interval, fault responses may be initiated.

Moreover, it is advantageous to provide a device for ascertaining the timing of gas exchange valves of an internal combustion engine, which has means for detecting a profile of a combustion chamber pressure, in which a calculation means calculates a state function on the basis of the detected profile of the combustion chamber pressure and a profile of a combustion chamber volume, and an evaluation means determines valve timings on the basis of the state function.

DETAILED DESCRIPTION

The known fact that a correlation between cylinder pressure p and cylinder volume V may be indicated by the state equation $$p_i \times V_i^n = K_i = \text{const}$$

forms a basis of the present invention. In this context index i characterizes scanning in any desired crankshaft angle. This correlation applies during the phases of the working cycle during which the gas volume is sealed inside the cylinder and no energy conversion by combustion takes place, i.e., in the compression phase prior to the start of combustion, and in the expansion phase following the end of combustion. Exponent n is mainly a function of the composition of the gas in the cylinder and the heat transfer from the gas to the environment. Constant K is not known, so that a calculation is possible only when at least two value pairs p1, V1 and p2, V2 are known. Depending on the operating mode, different—but known—values result for n. For instance, in a compression of a fuel-air mixture polytropic exponent n is approximately 1.32; if pure air is compressed, n is approximately 1.37. To this extent, polytropic exponent n may be selected as a function of the instantaneous operating mode, without being directly calculated from measured data.

Figure 1:
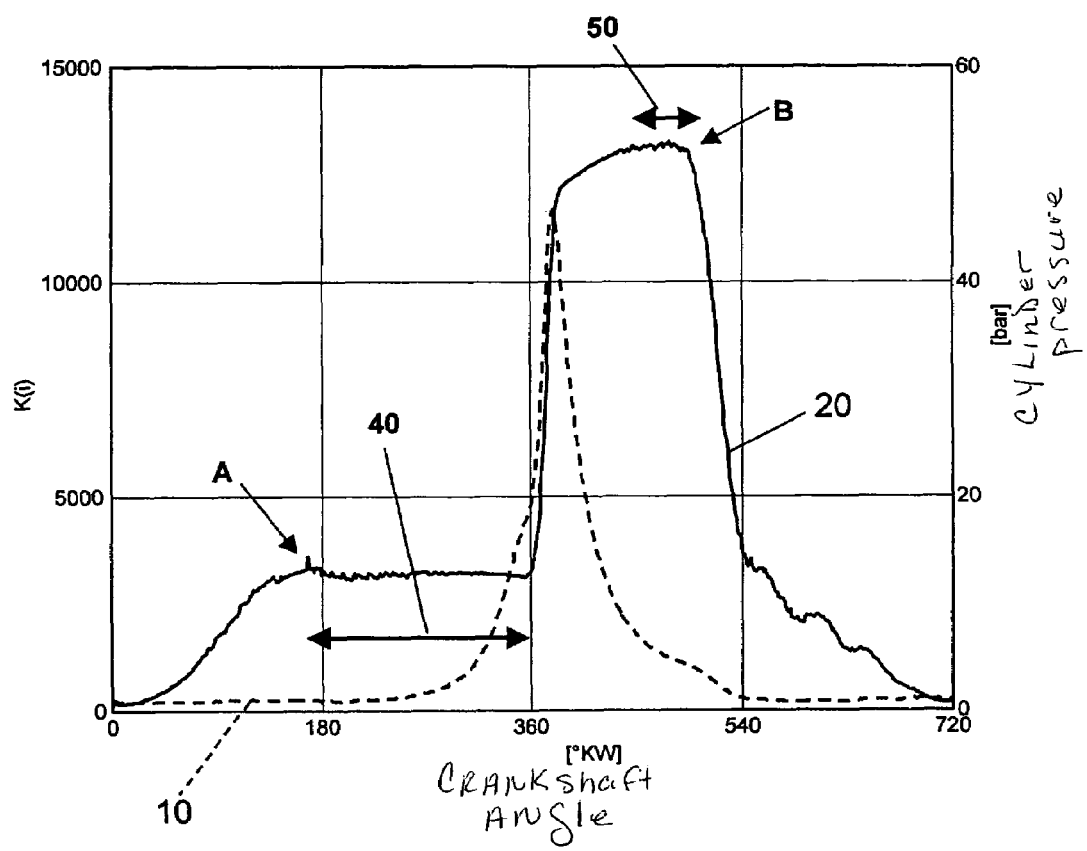
FIG. 1 shows functions according to the present invention.

The broken line in FIG. 1 shows a typical combustion chamber pressure characteristic 10 for a working cycle between 0° and 720° crankshaft angle KW. Combustion chamber pressure p begins to rise approximately 90° before top dead center TDC at 360°. Due to the ignition which has taken place in top dead center, the combustion chamber pressure continues to increase considerably because of the combustion, to then drop again after reaching a maximum in the expansion phase. In the example shown, the exhaust valve opens at approximately 500° KW, which is reflected in combustion chamber pressure characteristic 10 by a more rapid drop in pressure.

As already described at the outset, a multitude of methods known from the related art focuses on determining a significant curve section that may be associated with an opening of the exhaust valve, especially using the gradient method.

The present invention now provides to calculate a state function 20 on the basis of determined combustion chamber pressure characteristic 10 and combustion chamber volume V(i) which is generally known for each crankshaft angle KW.

$$K(i)=p(i) \times V(i)^n$$

This basically corresponds to the polytropic equation of state mentioned in the beginning. Index i set in parenthesis indicates only that i is considered a function parameter in this case. In the example at hand, i corresponds to crankshaft angle KW. If a chronological reference system is preferred, i may also quite easily be replaced by time t.

However, state function 20 according to the present invention goes beyond the known polytropic equation of state in that state function 20 is determined also for non-polytropic regions or states, in a manner that may come as a surprise to one skilled in the art. While it is true that the validity of the polytropic equation of state is no longer given outside the polytropic regions, significant changes in the state function result nevertheless, precisely because of the transition from a polytropic to a non-polytropic region.

The basis of the polytropic equation of state is that although a heat exchange with the environment is allowed, the system as a whole is considered sealed. The polytropic region is left as soon as the system is no longer considered sealed, for instance during combustion and, in particular, during opening or closing of one of the gas exchange valves. These events are significantly reflected in the state function and make it possible to identify an onset and end of the combustion as well as an opening or closing of the gas exchange valves.

The polytropic regions in FIG. 1 may essentially be seen in the virtually constant segments between 180° and 360° KW and 400° to 500° KW. First constant segment 40 begins with the true closing of the intake valve at point A at approx. 180° KW and ends with the onset of combustion at approximately 360° KW.

Second constant section 50 begins with the end of combustion at approximately 400° and ends with the opening of the exhaust valve in point B at approximately 500° KW.

Points A and B as onset and end point, respectively, of a polytropic region may thus be identified as control instants of the gas exchange valves and be ascertained without any problem by known evaluation methods, for instance by forming a first or second derivative with respect to the crank angle or the time. By viewing the extreme values or the change in operational signs, it is possible to identify points A and B. Algorithms that are band-restricted in the frequency range so as to limit the unavoidable noise of the combustion chamber pressure signal itself and for the further processing and analysis are preferably provided.

Figure 2:
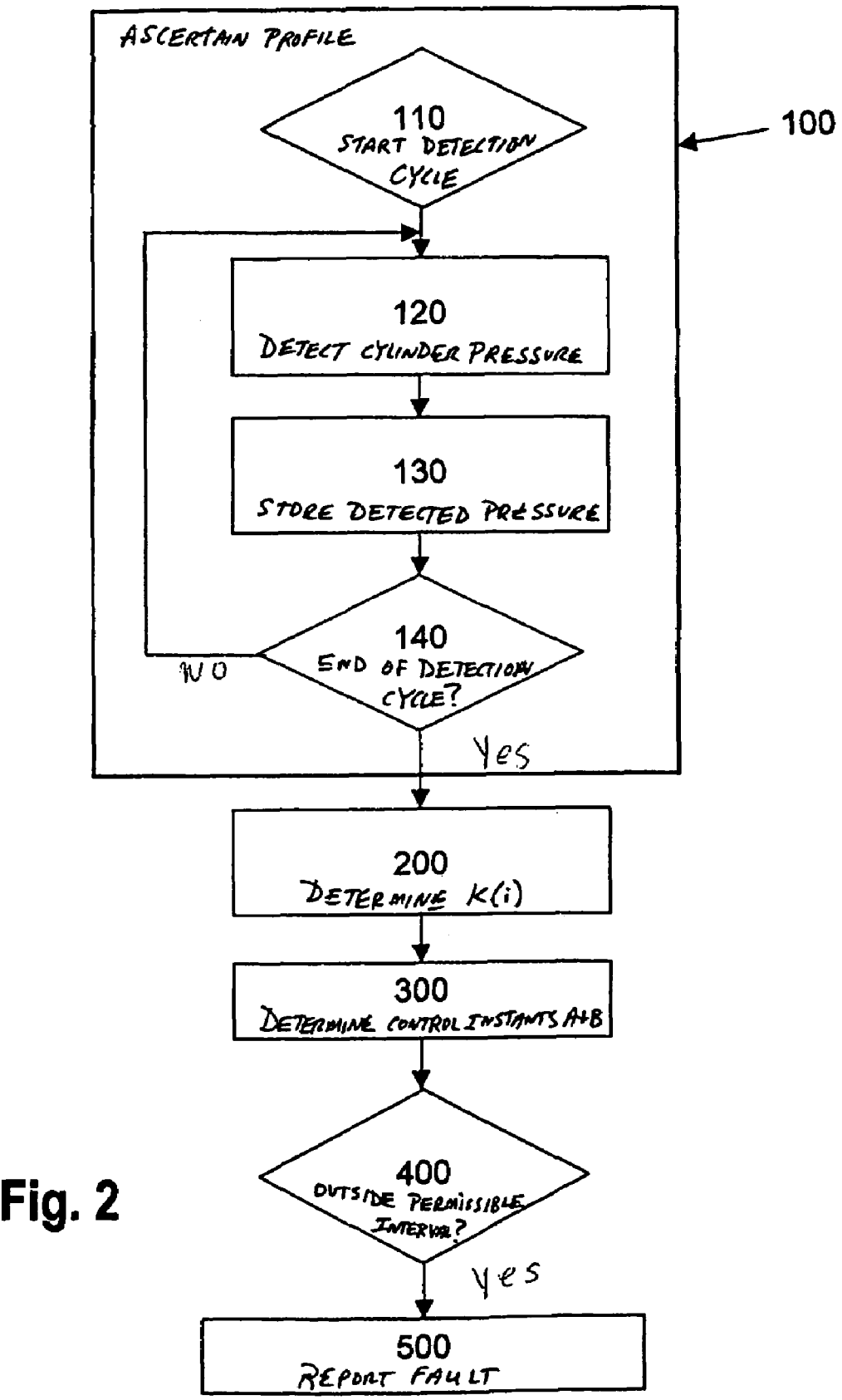
FIG. 2 shows a flow chart for monitoring gas exchange valves according to the present invention.

FIG. 2 illustrates by way of example a possible flow chart for monitoring the gas exchange valves. In a first step 100, a profile of the combustion chamber pressure is ascertained for a relevant crankshaft angular range. To this end, additional sub steps 110, 120, 130, 140 are provided in first step 100. Step 110 starts the detection cycle, and in subsequent step 120 a cylinder pressure p is detected for the instantaneous crankshaft angle. This variable is stored in step 130. It is then ascertained in step 140 whether the end of the detection cycle has been reached. If the end has not yet been reached, step 140 branches again to step 120, thereby beginning a new detection cycle. If the detection cycle is concluded, a state function K(i) is determined in a second step 200 on the basis of the now acquired profile of combustion chamber pressure p and the corresponding profile of combustion chamber volume V, taking the instantaneous operating condition into account.

In subsequent third step 300, control instants A and B are determined by analyzing state function K(i).

In fourth step 400, it is checked whether the ascertained control instants A and B fall within an individual allowed interval. For instance, for fault-free functioning of the internal combustion engine or the gas exchange valve, it may be provided that control instant A fall into a crankshaft angle interval of 150° to 190° KW. If a control instant outside a permissible interval is detected, a fault will be reported to a fifth step 500, and additional fault reactions possibly initiated. It may be provided, in particular, to intervene in the control of the gas exchange valves on the basis of ascertained control instants A and B so as to modify control instants of the gas exchange valves.

The information about a non-allowed deviation of the control instants may also be displayed by suitable auxiliary means, for example in the form of a diagnosis display.

Measures are usually taken only after a certain number of overranges has occurred in order to further increase the reliability of the diagnosis.

In addition, this information may be utilized for the control or regulation of the valves so as to compensate for changes in the control system (such as a change in the viscosity in hydraulic systems). The crank angles determined from segments A and B are then actual values for closed loop control circuits for the control of the intake and exhaust valves.

What is claimed is:

1. A method for ascertaining valve timing for gas exchange valves of an internal combustion engine, the method comprising:
    ascertaining a combustion chamber pressure characteristic;

calculating a state function from the combustion chamber pressure characteristic and a combustion chamber volume characteristic;

determining the timing of the gas exchange valves by analyzing the state function; and selecting a polytropic exponent as a function of a given operating mode, the polytropic exponent being fixed for the given operating mode.

2. The method according to claim 1, wherein the calculated state function is valid for all crankshaft angles.

3. The method according to claim 1, further comprising determining the polytropic exponent from at least two support points of an acquired combustion-chamber pressure and a corresponding combustion chamber volume in a polytropic region.

4. The method according to claim 1, further comprising:

in a first step, ascertaining a time characteristic of a combustion chamber pressure for a relevant crankshaft angular range;

in a second step, determining the state function;

in a third step, determining significant points which represent one of closing and opening instants of the gas exchange valves; and in a fourth step, checking whether the significant points lie within a tolerated interval.

5. A device for determining timing for gas exchange valves of an internal combustion engine, comprising:

an arrangement for ascertaining a combustion chamber pressure characteristic;

an arrangement for calculating a state function on the basis of the detected combustion chamber pressure characteristic and a combustion chamber volume characteristic;

an arrangement for determining valve timings on the basis of the state function; and an arrangement for selecting a polytropic exponent as a function of a given operating mode, the polytropic exponent being fixed for the given operating mode.

6. The device according to claim 5, wherein the given calculated state function is valid for all crankshaft angles.

* * * * *